UNITED STATES PATENT OFFICE.

ALMER McDUFFIE McAFEE, OF NEW YORK, N. Y.

MANUFACTURE OF ALUMINUM CHLORID.

1,144,304.	Specification of Letters Patent.	Patented June 22, 1915.

No Drawing.	Application filed March 2, 1915. Serial No. 11,548.

*To all whom it may concern:*

Be it known that I, ALMER McDUFFIE McAFEE, a citizen of the United States, residing at New York, in the county of New York and State of New York, have invented certain new and useful Improvements in the Manufacture of Aluminum Chlorid, of which the following is a specification.

This invention relates to manufacture of aluminum chlorid; and it comprises a method of making anhydrous, active aluminum chlorid from certain coky or sludgy residues formed in the catalytic conversion and refining of petroleum oils by aluminum chlorid wherein aluminum chlorid is extracted from such residues with water and hydrated aluminum chlorid formed, such hydrated aluminum chlorid is decomposed by heat to form hydrochloric acid and alumina, and such hydrochloric acid is passed over heated alumina in the presence of carbon to form vapors of anhydrous aluminum chlorid; such carbon being advantageously furnished by another portion of untreated residue; all as more fully hereinafter set forth and as claimed.

Aluminum chlorid is advantageously used for the sake of its catalytic properties in a number of processes in the manufacture and refining of petroleum products. It may for example be used to convert crude oil, gas oil, etc., into gasolene, or gasolene and kerosene; such conversion being total or partial, in which latter event a portion of good gasolene and a portion of much improved high boiling oil may be obtained. At lower temperatures aluminum chlorid may be used to remove the asphaltic constituents of lubricating oil, diminish the amount of unsaturated groups present, etc. In all these uses although the aluminum chlorid appears to act only by reason of its catalytic properties, yet after a time it loses activity. For example, after use in catalyzing oil for a time, on cooling the oil body, the aluminum chlorid settles out as a sludge. Through repeated use of the sludge on fresh oil, the sludge becomes more and more coky until finally it may become a comparatively hard, fine grained, coky deposit. In this coky mass the aluminum chlorid appears to be contained as such but it does not have its usual properties. For instance, it has lost much or most of its catalytic converting properties as regards oils; it cannot be vaporized away by heating the coky mass to a low red heat although aluminum chlorid, *per se*, volatilizes freely at 365° F. It may be that the aluminum chlorid is in combination with pitchy hydrocarbons or it may be that it is merely adsorbed and retained in some manner by the carbon. Where the oil with which the aluminum chlorid has been used was, as it should have been, dry, there is relatively little alumina in these residues; they appear to contain aluminum and chlorin in the correct proportion for aluminum chlorid. The aluminum chlorid may be released from its state of union or combination in these residues and regained in a highly active state by heating such coky residues with a modicum of chlorin (see Patent No. 1099096); a little chlorin serving to release a relatively large amount of active aluminum chlorid. The present invention relates to another manner of regaining aluminum chlorid from these residues.

The residues as they come from the oil converting or improving operation carry more or less oil; the amount of this oil differing with the particular process. If the sludge or coke carrying the aluminum chlorid has been allowed to cool down in the presence of the body of oil, it may contain as high as 40 to 50 per cent. of oil. If the oil body has been separated from the aluminum chlorid sludge or coky mass while hot and such sludge or coke is well drained, and particularly if vacuum draining be used, the amount of residual oil may be only 4 to 5 per cent.

I have found that if I take these residues after removing the oil, or the bulk of it, in any suitable manner, as by extraction, pressing or combustion, I can then extract the aluminum chlorid with a little water to obtain a concentrated solution of hydrated aluminum chlorid. Aluminum chlorid in the hydrated state does not have the catalytic properties of the anhydrous material but I may use the extracted hydrated salt as a raw material for making active anhydrous aluminum chlorid. To do this, I take advantage of the property of hydrated aluminum chlorid of breaking up when heated with the formation of alumina and hydrochloric acid (HCl). The alumina, when mixed with carbon, (which may be carbon derived from a portion of extracted sludge) and treated with hydrochloric acid vapors at a high temperature, reacts to form anhydrous aluminum chlorid vapors which may be condensed and reused. In utilizing this property I may, for example, roast one portion of hydrated aluminum chlorid to produce hydrochloric acid and water, separate the water from the vapors more or less perfectly, and then pass the dehydrated or dried HCl vapors over a portion of alumina from the same or from a previous operation, such alumina of course being used in admixture with carbon and in a highly heated state. In the presence of carbon the HCl reacts with the hot $Al_2O_3$ to form $Al_2Cl_6$, hydrogen and oxids of carbon. The aluminum chlorid vapors passing from the reaction zone may be condensed in any suitable manner.

In an advantageous embodiment of my invention instead of mixing the alumina from a roasting operation with pure carbon, I use fresh or untreated sludge or coke to furnish the necessary carbon. The carbon of this sludge or coke operates as before while such aluminum chlorid as is contained in the residue is liberated as the carbon disappears and joins that formed by the HCl acting on the alumina. In this manner I am enabled to largely increase my yield of active aluminum chlorid without increasing the expense of operation.

In using my method I may take the described sludgy or coky residue and first extract the oil. If the residue be rich in oil this may be accomplished in part in a centrifugal; the bulk of the oil being spun off. Heat sufficient to make the oil freely fluid should be employed. Any residual oil in the so treated mass may be burnt off or may be allowed to remain. Or instead of using a centrifugal I may take the residue and extract it with a little gasolene or the like to recover the oil. Or if the residue is comparatively poor in oil, containing, say 4 to 5 per cent., it may be simply roasted with a limited access of air.

In whatever manner the oil has been removed, the oil-freed residue is next subjected to the action of a small amount of water or of low temperature steam. Aluminum chlorid being very deliquescent, a little steam will suffice to form a saturated solution which may be readily extracted. In fact, prior to the extraction of the aluminum chlorid by water, these residues should be carefully guarded against contact with damp air since otherwise the aluminum chlorid will deliquesce rapidly.

In a practical embodiment of my invention I may take the oily sludge or coke and place it in any suitable type of centrifugal where it can be treated more or less hot. After the flow of oil has substantially ceased, the material may be removed and burnt or extracted with gasolene and returned. Or the material may be allowed to remain in the centrifugal without attempting to get rid of the remaining small amount of oil. In either case, I next expose the material in the centrifugal to the action of a limited amount of low temperature, saturated steam or to a fine spray of water; using but little water. The aluminum chlorid in the coky mass hydrates with the formation of a saturated solution which is then expelled by centrifugal action. The extracted coke or carbon from the centrifugal may be reserved for use in a later operation or may be used for fuel, for making carbon plastics, etc.

In extracting with water or steam in the centrifugal the solution formed should be as nearly saturated as possible. If wash water is used, it should be separately collected and used for extracting another charge. Much of the economy of the present operation depends on obtaining aluminum chlorid solutions as concentrated as possible. Instead of using a centrifugal, an ordinary suction filter or a filter press may be employed. However, a centrifugal is convenient. The strong solution of aluminum chlorid is next evaporated at as low a temperature as possible. This results, according to circumstances, in a crystalline or a gummy mass. In either event the aluminum chlorid so obtained is next carefully roasted at a slowly increasing temperature. Under the influence of the heat it dehydrates and forms hydrochloric acid vapors. The vapors may be passed through sulfuric acid or over calcium chlorid to remove the water and give a dry, or substantially dry, HCl gas. This drying is not absolutely necessary but it is advantageous since it reduces the amount of deoxidation necessary in the formation of aluminum chlorid in a subsequent operation. Any water vapor which may occur with the hydrochloric acid gas, must also be reduced by carbon in the formation of aluminum chlorid; that is, in making anhydrous aluminum chlorid there must be carbon present sufficient in amount not only to reduce the $Al_2O_3$ but also any $H_2O$ which may be present.

Ordinarily I conduct the roasting of one sample to produce HCl and the treatment of a body of alumina with such HCl simultaneously although the HCl driven off from a given portion of coky residue may be returned into contact with the same alumina. The alumina resulting from the roasting operation is dehydrated as far as possible by the heat prior to conversion with HCl and carbon.

The dehydrated alumina so formed is next mixed with carbon. The carbon and alumina may be formed into cakes or briquets with the aid of a little tar, asphalt, pitch or other binder, but the necessity of this of course depends largely upon the type of apparatus employed in heating the mixture to a high temperature to form and volatilize aluminum chlorid.

In an advantageous embodiment of this invention in lieu of using coke or carbon in making this mixture to form aluminum chlorid from alumina I use a portion of untreated sludgy or coky residue. In so doing, the oil remaining in the residue may be relied upon to act as a binder in forming cakes or briquets if such be made. The use of untreated residues for furnishing carbon has the advantage that as the carbon disappears in the reduction of the alumina the aluminum chlorid which it holds is released and joins the new aluminum chlorid which is made.

The alumina in admixture with carbon, or with coky or sludgy residues, as the case may be, is next exposed to the action of dry or substantially dry hydrochloric acid vapors coming from a roasting operation. This exposure should be at a low red heat and may be performed in any suitable retort or other apparatus. Under the influence of the heat the alumina is reduced, as previously described, and forms aluminum chlorid which volatilizes and passes forward to be condensed. Any moisture present is also reduced to form hydrogen.

Instead of regaining the hydrated aluminum chlorid by evaporation in the manner previously described, the concentrated solution may be treated with a little hydrochloric acid gas. While aluminum chlorid is very soluble in water, and in weak hydrochloric acid, it is quite insoluble in solutions containing a moderate amount of HCl and crystallizes out. This is a convenient method of recovering hydrated aluminum chlorid in a granular crystalline state well adapted for the roasting operation. While the coky or sludgy residue may be treated with water in bulk, as by placing it in a vat with water, I do not recommend this procedure since the solutions so obtained are not as concentrated, and consequently not as advantageous, as those made in the manner just described.

Where the operation is carefully conducted throughout, the amount of hydrochloric acid obtained should be sufficient to convert the alumina into reactive anhydrous aluminum chlorid. But where losses of hydrochloric acid occur before any stage they may be supplemented by the addition of hydrochloric acid gas from another source or by an addition of chlorin. This chlorin is best added to the HCl gas transmitted over the admixture of alumina and carbon or of alumina and sludgy residue.

In an alternative embodiment of my invention, in lieu of extracting hydrated aluminum chlorid from the residual carbon I may simply allow it to remain, the carbon of the residue itself acting as a reducing agent. In so doing, I may, for example, steam or moisten a portion of the coky residue. This hydrates the aluminum chlorid but does not remove it from the carbon. On now roasting, HCl is formed as before and as the temperature increases the HCl now acts on the alumina in the presence of the carbon of the coky residue to form anhydrous chlorid. There is ordinarily sufficient carbon present not only to reduce the alumina but also a substantial amount of $H_2O$. In this operation however the amount of moisture or steam used is ordinarily restricted to the amount merely sufficient to break up the aluminum chlorid. The HCl formed in roasting may be removed and dehydrated and then returned for the operation at high heat or it may be allowed to remain in the chamber. For example, a charge of coky residue in a retort may be treated with a little steam and then the heat progressively raised through the roasting temperature to the temperature necessary to form anhydrous aluminum chlorid.

What I claim is:—

1. In the treatment of coky or sludgy residues arising from the treatment of oil with anhydrous aluminum chlorid, the process which comprises treating such residues to obtain hydrated aluminum chlorid, breaking up the hydrated aluminum chlorid by heat to form hydrochloric acid and alumina, mixing the alumina with carbon and submitting the mixture to the action of hydrochloric acid gas at a high temperature.

2. In the treatment of coky or sludgy residues arising from the treatment of oil with anhydrous aluminum chlorid, the process of making anhydrous active aluminum chlorid from sludgy or coky residues containing the same, which comprises treating such residues to obtain hydrated aluminum chlorid, breaking up the hydrated aluminum chlorid by heat to form hydrochloric acid and alumina, mixing the alumina with carbon in the form of untreated coky residue and submitting the mixture to the action of hydrochloric acid gas at a high temperature.

3. In the treatment of coky or sludgy residues arising from the treatment of oil with anhydrous aluminum chlorid, the process of making anhydrous active aluminum chlorid from sludgy or coky residues containing the same, which comprises extracting oil from such residues, treating extracted residue with a limited amount of moisture to produce a concentrated solution of hydrated aluminum chlorid, breaking up the hydrated aluminum chlorid by heat to produce hydrochloric acid and alumina, admixing the alumina with carbon and exposing to the action of hydrochloric acid vapors.

4. In the treatment of coky or sludgy residues arising from the treatment of oil with anhydrous aluminum chlorid, the process of making anhydrous active aluminum chlorid from sludgy or coky residues containing the same, which comprises extracting oil from such residues, treating the extracted residue with a limited amount of moisture to produce a concentrated solution of hydrated aluminum chlorid, breaking up the hydrated aluminum chlorid by heat to produce hydrochloric acid and alumina, admixing the alumina with fresh untreated residues.

5. In the treatment of coky or sludgy residues arising from the treatment of oil with anhydrous aluminum chlorid, the process which comprises hydrating such aluminum chlorid, roasting to form HCl and $Al_2O_3$ and heating the $Al_2O_3$ with HCl and carbon at a high temperature and submitting the mixture to the action of hydrochloric acid at a high temperature.

In testimony whereof, I affix my signature in the presence of two subscribing witnesses.

ALMER McDUFFIE McAFEE.

Witnesses:
K. P. McELROY,
GEORGE G. McDANIEL.